United States Patent
Barrington

(10) Patent No.: US 9,659,507 B2
(45) Date of Patent: May 23, 2017

(54) PROCESS FOR CLEARING A TOOTH AND ILLUSTRATING THE INTERNAL STRUCTURE

(71) Applicant: Craig Barrington, Waxahachie, TX (US)

(72) Inventor: Craig Barrington, Waxahachie, TX (US)

( * ) Notice: Subject to any disclaimer, the term of this patent is extended or adjusted under 35 U.S.C. 154(b) by 233 days.

(21) Appl. No.: 14/310,563

(22) Filed: Jun. 20, 2014

(65) Prior Publication Data

US 2015/0371557 A1 Dec. 24, 2015

(51) Int. Cl.
*G09B 23/28* (2006.01)

(52) U.S. Cl.
CPC .................. *G09B 23/283* (2013.01)

(58) Field of Classification Search
USPC ....... 434/262, 263, 267, 270, 274, 295, 296; 264/16, 19; 433/213, 215, 216, 229
See application file for complete search history.

(56) References Cited

U.S. PATENT DOCUMENTS

| | | | | |
|---|---|---|---|---|
| 1,021,952 | A * | 4/1912 | Werner | G02B 7/004 359/896 |
| 7,530,812 | B2 * | 5/2009 | Chyz | G09B 23/283 434/263 |
| 8,221,128 | B2 * | 7/2012 | Kadobayashi | G09B 23/283 264/19 |
| 8,267,695 | B2 * | 9/2012 | Kadobayashi | G09B 23/283 264/16 |
| 8,425,233 | B2 * | 4/2013 | Kadobayashi | G09B 23/283 264/16 |
| 8,779,167 | B2 * | 7/2014 | Ma | C07D 309/30 549/292 |
| 8,784,112 | B2 * | 7/2014 | Kadobayashi | G09B 23/283 264/19 |

OTHER PUBLICATIONS

N.J. Muriithi et al, "Internal Root Morphology in Maxillary First Permanent Molars in a Kenyan Population", East African Medical Journal vol. 88 No. 3 Mar. 2011, pp. 86-92 [retrieved online Apr. 18, 2016].*
Bhavana Gupta et al, "Transparent Tooth Model: A Study of Root Canal Morphology Using Different Reagents", Eur J Gen Dent 2014;3:66-70 [retrieved online Apr. 18, 2016].*
O.E. Omer et al, A Comparison Between Clearing and Radiographic Techniques in the Study of the Root-Canal Anatomy of Maxillary First and Second Molars, International Endodontic Journal 37, 291-296, 2004 [retrieved online Apr. 18, 2016].*

* cited by examiner

*Primary Examiner* — Kurt Fernstrom
(74) *Attorney, Agent, or Firm* — Kerry D. Green

(57) ABSTRACT

A process for clearing an extracted tooth comprising the steps of drying the extracted tooth by exposure to air to produce a dried tooth, exposing the dried tooth to a decalcifying solution to produce a decalcified tooth, exposing the decalcified tooth to a non-alcohol dehydrant to produce a dehydrated tooth, exposing the dehydrated tooth to a clearing agent in a container until a desired amount clearing occurs, whereby the tooth is rendered translucent revealing its internal anatomy.

13 Claims, 1 Drawing Sheet

Clearing a Tooth
100

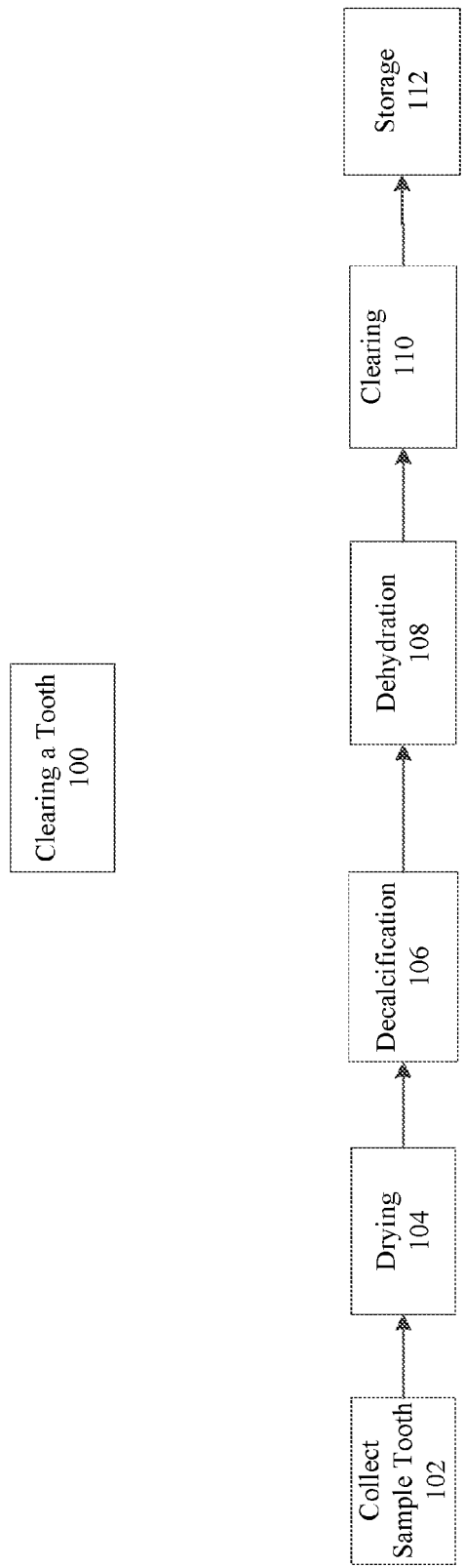

PROCESS FOR CLEARING A TOOTH AND ILLUSTRATING THE INTERNAL STRUCTURE

CROSS-REFERENCE TO RELATED APPLICATIONS

None.

FIELD OF THE INVENTION

The invention generally relates to a process for clearing and illustrating the internal structure a tooth and, more particularly, to a method for processing the tooth from the time of extraction to a transparent specimen with the internal structure displayed.

SUMMARY OF THE INVENTION

The invention relates to a process rendering a biological specimen transparent while retaining the specimen's internal structure thereby making it visible for study. More particularly, the invention relates to a process of rendering a freshly extracted or a tooth stored in such a manner that is in the same or similar condition as a freshly extracted tooth transparent while retaining the tooth's internal structure by leaving the blood on the tooth and allowing the blood to clot and dry thus clogging the apical openings in the tooth. As the tooth dries, some shrinkage occurs having the effect of enlarging the internal areas of the tooth where the nerve resided. Using this process, the clogging causes air to be trapped within the tooth and as the shrinkage occurs, the air expands into all the internal areas where the nerve of the tooth had resided thereby making the internal structure visible for study by persons in the field of endodontology allowing them to better diagnose, prevent, and treat diseases of the dental pulp.

A clear understanding of the root canal anatomy is a prequisite for conventional endodontic procedures. A consistent level of success in treatment depends on a significant understanding of the root canal anatomy and its morphology. One way to gain this understanding is through histology or diaphonization both of which render the specimen transparent and dyed or stained to reveal the internal structure. Histology is used for microscopic specimens such as tissues or organs. Additionally, diaphonization is a process that is used on larger specimens such a frogs and fish. Both processes allow for the preservation of the internal structure while still keeping the specimen in one piece.

To reveal the internal structure using the dye or stain injection method, the tooth is penetrated creating an injection site wherein the dye or stain can be inserted to reveal the internal structure. This penetration may damage the internal structure and create a false illustration of the internal structure when stained or dyed. Additionally, the amount of internal structure revealed is based on the pressure used during the injection process, which is discussed later. Using a stain or dye has another disadvantage of being very messy when used requiring a significant amount preparation and clean up.

U.S. Pat. Pub. No. U.S. Pat. No. 1,021,952 to Spalteholtz teaches a method which makes it possible to inspect the internal structure or composition of bodies whether organic or inorganic by filling the body with a material having a refractive index that corresponds as exactly as possible to the body. Additionally, Spalteholtz used alcohol to dehydrate the body in preparation for clearing which removed the blood from the canal area.

Diaphonization has been applied to teeth in order to understand the human pulpal anatomy. One prominent method was developed by Frank Vertucci wherein he cleared the tooth in a process described hereinafter and developed classifications based on the canal structure. The method for clearing a tooth involves the following steps: creating an access cavity, washing the tooth with a cleaning solution, decalcifying the tooth with nitric acid, dehydrating using alcohol and finally immersing the tooth in methyl salicylate.

Both Spalteholtz and the Vertucci methods use alcohol as the deydrant which dissolves the blood clots inside the tooth and removes the blood from the canal and Vertucci injects a dye to reveal the structure. The illustration of the canal structure depends on the cleanliness of the canal and the pressure at which the dye is injected. If too much or too little pressure is used when injecting the dye then the illustration may falsely represent the pupal anatomy. Additionally, the tooth has to be compromised by creating an injection site thereby possibly creating other weaknesses and distortions in the pulpal anatomy.

The present invention overcomes these shortcomings in the prior art and process with a process that does not compromise the tooth with the creation of an injection site, uses a dehydrant other than alcohol for dehydration thus preventing the dissolution of the blood clots and does not inject any stain or dye to reveal the internal structure. Instead, the claimed method uses the blood clots internal to the tooth to illustrate the canal structure after the clearing has been completed. Additionally, it provides a more accurate depiction of the internal structure, a much cleaner method for processing the tooth, and makes it easier to photograph the tooth to reveal its structure. The present invention fulfills the industry's need for illustrating the accurate pulpal anatomy by providing a method that can be used to reveal the true canal structure without the tooth or its internal structure.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE DRAWINGS

FIG. 1 is a flow diagram illustrating a process for clearing a tooth.

DETAILED DESCRIPTION OF THE INVENTION

FIG. 1 illustrates the preferred process for clearing a tooth 100 highlighting six steps: tooth collection 102, drying 104, decalcification 106, dehydration 108, clearing 110, and storage 112. Collecting 102 a tooth may be the initial step in the process. The tooth can be a freshly extracted tooth from a donor or a tooth, which has been previously extracted but stored in such a manner as not to destroy the internal anatomy through the method of storage. One such method of storage is freezing, which maintains the freshly extracted tooth in its original state. Once a person skilled in the art was ready to complete the process, they would remove the tooth from frozen storage and allow it to reach room temperature at which time both the preferred freshly extracted tooth or a stored tooth would be subjected to the drying 104 step, the next step in the process.

The preferred next step in this process can be drying 104 of the tooth by exposure to ambient air. The speed at which the tooth dries depends on various environmental conditions such as temperature, humidity, pressure, and the internal structure and contents of the pulp chamber. Typically, a tooth will take between 4 and 96 hours to dry under normal room conditions. The speed at which drying 104 occurs can be changed by increasing the room temperature to reduce the drying time required or decrease the drying speed by lowering the room temperature. Additionally, a tooth may be dried by other methods including mechanical drying devices such as an oven or blow dryer but not limited to, other methods of drying 104 the tooth will be apparent to one skilled in the art. After the tooth is dried, it may proceed to the decalcification 106 step.

To decalcify 106 the tooth, it may be exposed to a decalcifying solution to remove the calcification that may prevent clearing. One skilled in the art may select a decalcifying solution from a family of strong acids, weak acids, and chelating agents. Examples of these types of decalcifying solutions include Nitric Acid, Hydrochloric Acid, Formic Acid, and the preferred decalcifying solution Decalcifier Solution II®. Additionally, the type of solution that may be used will depend on the speed and the depth of the decalcification of the tooth desired by one skilled in the art. The strength of the decalcifying solution determines the speed at which the solution will decalcify the tooth. To decalcify the tooth quickly, a strong solution may be used, however there are risks associated with the strong solution wherein it may decalcify so quickly that it exceeds the depth of the decalcification desired and damage the tooth. In such a case, the strong solution may be diluted to control the speed or rate of decalcification. Furthermore, if the solution is too weak it may never achieve the desired level of decalcification for this step and may hinder the clearing of the tooth thus preventing the internal tooth's anatomy from being sufficiently exposed. The depth of decalcification may be determined from the level of the tooth's anatomy desired to be shown by one skilled in the art but the depth should not be so great as to damage the tooth or its internal anatomy. A preferred method of decalcifying a tooth for this process is to use the Decalcifier Solution II® mentioned above and leaving the tooth in the solution from a time ranging from 4 to 36 hours. The tooth should be checked frequently in order to determine the level of decalcification and may be removed once the tooth has reached the preferred level of decalcification. Once the decalcification is complete, the tooth may proceed to the next step in the clearing process 100, which is the dehydration step 108 used to remove any excess water.

Dehydration 108 occurs by exposing a decalcified tooth to a non-alcohol dehydrant thereby producing a dehydrated tooth. This step is designed to remove all the water from inside the tooth's internal anatomy. One skilled in the art may use one of many types of dehydrants available with the limitation being that the dehydrant may not contain alcohol. Some of the types of dehydrants available are Magnesium Sulfate, Dalmetrius Earth Calcium Chloride, Silica Gel, and the preferred dehydrant is Silicasan. Typically, this dehydrant is commonly known as kitty litter. The decalcified tooth is exposed to the dehydrant for approximately 2 to 8 hours wherein one skilled in the art would constantly monitor the condition of the dehydration process. Once the tooth has obtained the desired level, the tooth is removed from the dehydrant and any dehydrant remaining should be cleaned without water or alcohol before proceeding to the following step.

A next step in the preferred process 100 is the clearing of the tooth 110. The clearing occurs when a dehydrated tooth is exposed to a clearing agent in a clear container until the desired amount of clearing occurs. The clearing agent should have a refractive index that is compatible with a tooth to be cleared. Typically, one skilled in the art may choose a clearing agent with a refractive index ranging from 1.4 to 1.7 in order to be compatible with the tooth. The preferred refractive index for clearing a tooth is 1.535. The tooth may be exposed to the clearing agent from 5 minutes to 48 hours and the tooth will be monitored during this time and photographed at intervals selected by one skilled in the art to capture the tooth's internal anatomy as it clears. Under this step, the preferred time for clearing is 24 hours enabling the tooth to reach the desired level of clearing for one skilled in the art. However, once the maximum amount of clearing has occurred exceeding the time of the range will not damage the tooth unlike the decalcification.

Once the tooth has completed the clearing process 100 to the satisfaction to one skilled in the art, it must be stored 112 in such a way as to maintain its final condition i.e. the level of clearing. The tooth should remain in the clearing agent indefinitely in order to maintain its translucence. If the tooth is removed from the clearing agent, it will immediately start reverting to its former state of opaqueness. These steps described above illustrate the preferred process for clearing a tooth and capturing its internal anatomy.

FIG. 2 illustrates the process by which a cleared tooth may be photographed as described in FIG. 1 step 110, the clearing step. FIG. 2 photographing a tooth 200 highlights six possible steps: tooth positioning 202, photographic device positioning 204, illumination 206, photography 208, storage 210, and display 212.

Tooth positioning 202 requires the tooth to be placed in a transparent container while surrounded by the clearing agent. The tooth may be positioned to enable the photographer to capture its internal anatomy. To fully capture the internal anatomy, one skilled in the art may reposition the tooth inside the transparent container in order to obtain the desired views and lighting while photographing the cleared tooth at the different positions. After the tooth is positioned, the photographic device is typically positioned next.

The photographic device positioning 204 may consist of a photographic device placed over the tooth in the desired position. The photographic device may consist of a microscope working in concert with a recording device such as a camera, video recorder, or some other type of photographic device. The recording device may be mounted directly to the microscope or a camera may send information to a remote recording device. The preferred method is to affix a camera to the microscope. The magnification power setting i.e. zoom of the microscope may range from 2 to 26 power, but the preferred zoom power setting allows the cleared tooth to be photographed such that the internal structure within the tooth is clearly exposed. The preferred power setting, which is used provides for a more global picture of the tooth without zooming in so much as to see all the microscopic details of the tooth. To one skilled in the art, other power setting may be desired depending on the detail of the tooth that is desired. To aid in the capture of these photos is the illumination 206.

The illumination 206 allows for the positioning of a light to provide the desired lighting or light effect for the photographs of the tooth. The light may be positioned to prevent the camera from being blinded or distorting the picture while highlighting the structure of the tooth. This positioning may be based on the views desired by one skilled in the art. This illumination can occur by using various types of light sources such natural light, Xenon, LED, fiber optic light, incandescent light, and fluorescent light. The preferred method of lighting is a Xenon light and placing the Xenon light at some angle that is not in opposition of the camera lens thus providing a great degree lighting while preventing the blinding of the camera. Once the tooth has been positioned, the photographic device positioned, and the lighting positioned, the next step in the photographing 200 process is actually photographing the tooth 208.

This step photography 208 occurs during the previous clearing 110 step described in FIG. 1. Different photographs and images will be captured as the tooth goes from its normal condition after it has been dried and dehydrated to its final cleared condition. One skilled in the art may choose the time interval for photographing the tooth as it goes from its various stages of originality to translucent. The photographing 208 may be done manually or may be automated using some type of timer and triggering device.

Once one skilled in the art has collected sufficient photographs for their purpose they may store 210 them in any normal known mediums such as electronic media or photographic material, which are incorporated by reference. After the storage of the images, a possible final step is the displaying the images 212 using the standard means of photographic paper and electronic media that is known to one skilled in the art.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described or disclosed. Such other embodiments or modifications are intended to be reserved especially as they fall within the scope of the claims herein appended.

Having thus described the invention, I claim:

1. A process for clearing an extracted tooth comprising the steps of:
    a. selecting an extracted tooth where a pulp cavity is in its natural form connected to an external environment only through the root;
    b. maintaining the extracted tooth in its natural form where the pulp cavity remains unpenetrated throughout the process;
    c. maintaining the pulpal material in the pulp cavity;
    d. drying the extracted tooth by at least exposure to air to produce a dried tooth;
    e. exposing the dried tooth to a decalcifying solution to produce a decalcified tooth;
    f. exposing the decalcified tooth to a non-alcohol dehydrant to produce a dehydrated tooth; and
    g. exposing the dehydrated tooth to a clearing agent in a container until a desired amount clearing occurs,
    whereby the tooth is rendered translucent revealing its internal anatomy.

2. The process of claim 1 wherein drying occurs for a time from 4 to 96 hours.

3. The process of claim 1, the decalcifying solution selected from strong acids, weak acids, chelating agents.

4. The process of claim 1, the decalcifying solution selected from Decalcifier Solution II®, nitric acid, Cal-Ex™ II Fixative/Decalcifier, hydrochloric acid, Perenyi's fluid, Von Ebner's solution, formic acid, Evans and Krajian fluid, Kristensen solution, Gooding and Stewart fluid, and a neutral EDTA chelating agent.

5. The process of claim 4 wherein the tooth is exposed to a decalcifying solution for a time ranging from 4 to 36 hours.

6. The process of claim 1, the dehydrant selected from magnesium sulfate, diatomaceous earth, calcium chloride, silica gel, and silica sand.

7. The process of claim 6 wherein the tooth is exposed to the dehydrant for a time from 2 hours to 8 hours.

8. The process of claim 1 wherein the clearing agent has a refractive index from 1.4 to 1.7.

9. The process of claim 1 wherein the clearing agent has a refractive index of 1.535.

10. The process of claim 8 wherein the tooth is exposed to the clearing agent for a time from 5 minutes to 48 hours.

11. The process of claim 8 wherein the tooth is exposed to the clearing agent for 24 hours.

12. The process of claim 1 further comprising, after the tooth is exposed to a clearing agent, a step of capturing at least one photographic image of the tooth in at least one state of clearing in at least one time frame.

13. A process for clearing an extracted tooth comprising the steps of:

a. selecting an extracted tooth where the pulp cavity is in its natural state connected to an external environment only through the root;
b. maintaining the extracted tooth in its natural form where the pulp cavity remains unpenetrated throughout the process;
c. maintaining the pulpal material in the pulp cavity
d. drying the extracted tooth by at least exposure to air to produce a dried tooth;
e. exposing the dried tooth to a decalcifying solution selected from strong acids, weak acids, chelating agents to produce a decalcified tooth;
f. exposing the decalcified tooth to a non-alcohol dehydrant selected from magnesium sulfate, diatomaceous earth, calcium chloride, silica gel, and silica sand to produce a dehydrated tooth; and
g. exposing the dehydrated tooth to a clearing agent having a refractive index from 1.4 to 1.7 in a container until a desired amount clearing occurs,
whereby the tooth is rendered translucent revealing its internal anatomy.

* * * * *